United States Patent [19] [11] 4,373,160
Cooper [45] Feb. 8, 1983

[54] ANTENNA ARRANGEMENTS

[75] Inventor: David Cooper, Chelmsford, England

[73] Assignee: Marconi Company Limited, Chelmsford, England

[21] Appl. No.: 178,542

[22] Filed: Aug. 8, 1980

[30] Foreign Application Priority Data

Aug. 10, 1979 [GB] United Kingdom ................ 7928011

[51] Int. Cl.[3] ............................................ H04B 7/00
[52] U.S. Cl. ............................... 343/100 SA; 455/126
[58] Field of Search ............ 343/100 SA, 105 R, 101, 343/102, 108 R; 455/118, 119, 126, 108, 113

[56] References Cited

U.S. PATENT DOCUMENTS

| | | | |
|---|---|---|---|
| 3,141,134 | 7/1964 | Osborne et al. | 455/126 |
| 3,418,578 | 12/1968 | Bose | 455/113 |
| 3,831,094 | 8/1974 | Stover | 455/119 |
| 3,832,713 | 8/1974 | Rubin | 343/100 SA |
| 3,858,215 | 12/1974 | Miller et al. | 343/102 |

FOREIGN PATENT DOCUMENTS

| | | |
|---|---|---|
| 2812575 | 9/1979 | Fed. Rep. of Germany . |
| 656124 | 8/1951 | United Kingdom . |
| 1468044 | 3/1977 | United Kingdom . |

OTHER PUBLICATIONS

Patent Abstracts of Japan vol. 4, No. 36, Mar. 26, 1980, p. 156E3, JPA5510271.
Taschenbuch der Hochfrequency Technik, by H. Meinke and F. W. Gundlach, Springer—Verlag Berlin/Heildelberg/New York, 1968, pp. 1509–1511.

*Primary Examiner*—Theodore M. Blum
*Attorney, Agent, or Firm*—Spencer & Kaye

[57] ABSTRACT

An antenna arrangement is provided with a phase lock loop so that the phase of microwave energy radiated by an antenna element can be precisely controlled. The phase lock loop provides compensation for phase errors introduced in the feed to the antenna element and includes a controllable local oscillator. In practice, a large number of individual antenna channels could be provided, each having its own phase lock loop, so that together a directional microwave beam could be radiated. Such a requirement can exist in connection with pulsed radars.

8 Claims, 3 Drawing Figures

ANTENNA ARRANGEMENTS

This invention relates to antenna arrangements and is specifically concerned with those which are able to radiate a high frequency signal (typically of the order of microwave frequencies) having an accurately controllable phase. A requirement of this kind can arise when an antenna arrangement having a number of individual antenna elements is to radiate a beam of microwave energy in a particular direction. One way of adjusting the direction in which the beam is radiated is by controlling the phases of the microwave signals radiated by each antenna element relative to the phases of adjacent elements so that the microwave energy combines in phase in the required direction of radiation. The antenna arrangement may form part of a radar system in which a very high energy beam is required, but it is difficult and expensive to provide phase shifters which are capable of operating at very high power levels, and the expedient of inserting an amplifier between a low power phase shifter and an antenna element to produce radiation of a high power signal is not entirely satisfactory. This is because the phase delays introduced by the amplifiers may vary one from another because of changes of frequency, temperature or beam pointing angle in a manner which is not entirely predictable, and which may require additional circuits for compensation. The present invention seeks to provide an improved antenna arrangement.

According to this invention an antenna arrangement includes at least one antenna channel comprising means for feeding a carrier signal via an amplifier to an antenna element; a phase-locked loop which includes, in addition to said amplifier, means for receiving a signal having a reference phase and means for generating an intermediate frequency signal having a controllable phase; and means for controlling the phase of said intermediate frequency signal so that the phase of the carrier signal at the antenna bears a required relationship with said reference phase.

Preferably said means for generating an intermediate frequency signal comprises variable frequency oscillator, the output signal of which is mixed with a high frequency signal to form said carrier signal.

Preferably again the output of said amplifier is mixed with said high frequency signal at a mixer, the phase of the signal produced by the mixer being compared with a required value and the result of said comparison being used to control the phase of said intermediate frequency signal.

In order to provide a fine phase control, preferably means are provided for generating the nth harmonic of the signal produced by the mixer, and means are also provided for comparing its phase with said reference phase, and for generating a signal to control the frequency of said oscillator. The phase of said intermediate frequency signal can be altered in steps of $2\pi/n$ by temporarily altering the frequency of said oscillator. Thus by making n large, a very fine phase control can be achieved. Since the amplifier forms part of the phase-locked loop any otherwise variable phase shifts which occur are automatically compensated.

Where the antenna arrangement forms part of a radar system in which a directional radar beam is formed by adjusting the relative phases of microwave energy transmitted by an array of individual antenna elements, preferably a plurality of antenna channels are provided, with the phase of the energy radiated by the different antenna elements being determined by the phase of the intermediate frequency signal generated within the phase-locked loop, which forms part of its associated antenna channel.

In general, the phase of the intermediate frequency signal will be different for each antenna channel of a linear array of antenna elements, but all antenna channels are preferably supplied with a common high frequency signal so that each antenna radiates at the same carrier frequency. The frequency of this common signal may, however, be varied from time to time so conferring frequency "agility" upon the radiated signal.

Preferably again all channels are supplied with the same reference phase. The signal carrying the reference phase is thus the same multiple of the intermediate frequency for all antenna channels.

Since the phase shifts required for the antenna channels are generated at relatively low power levels by means of an oscillator in each phase-locked loop, the need for high power phase shifter is avoided. Additionally, the use of the amplifiers in the feed to the antenna elements to raise the signal to the required high power level does not introduce unacceptable phase distortions as the amplifiers form part of the respective phase-locked loops.

The invention is further described by way of example with reference to the accompanying drawings in which.

Figure 1:
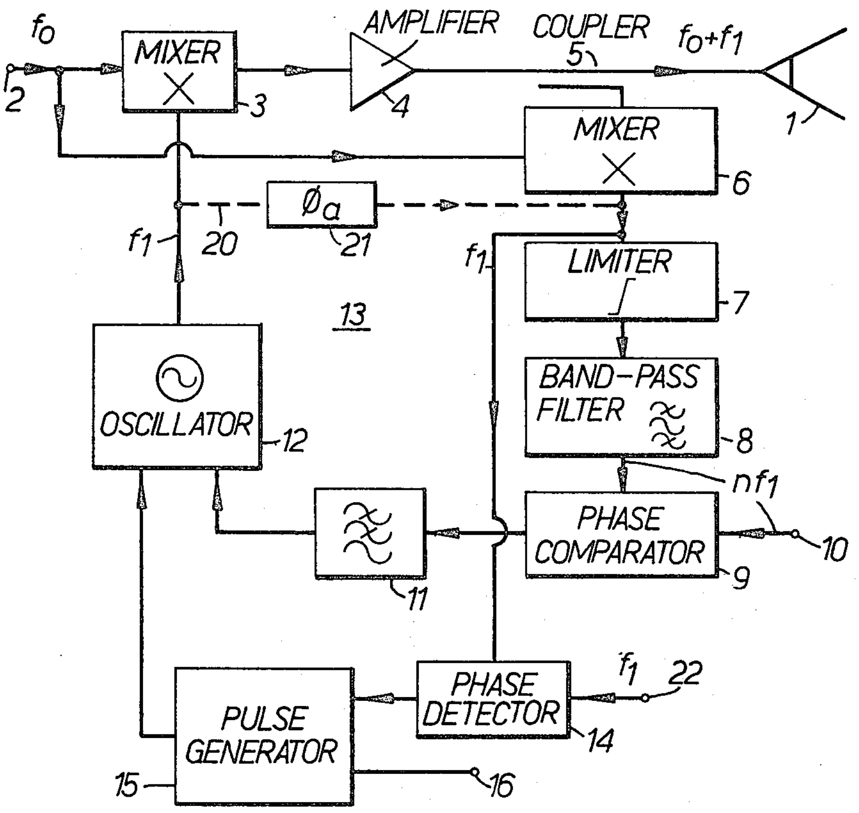
FIG. 1 illustrates an antenna channel in accordance with the present invention.

Referring to FIG. 1, an antenna channel is provided with an antenna element 1, which is fed from an input terminal 2 via a mixer 3, an amplifier 4 and a coupler 5. The coupler 5 couples a small fraction of energy to a further mixer 6. The output of the mixer 6 is passed, via a harmonic generator 7 and a bandpass filter 8, to one input of a phase comparator 9. The other input of the phase comparator 9 receives in reference phase via an input terminal 10 and the phase comparator 9 produces an output signal as a result of the phase comparison which is passed via a low pass filter 11 to control the frequency and phase of a voltage controlled oscillator 12. The output of the oscillator 12 feeds directly into the mixer 3. Thus the mixer 3, the amplifier 4, the coupler 5, the mixer 6, the harmonic generator 7, the bandpass filter 8, the phase comparator 9, the low pass filter 11 and the oscillator 12 constitute a phase-locked loop 13.

In operation, a microwave signal having a frequency $f_o$ is received at terminal 2 and is mixed at mixer 3 with a frequency $f_1$ generated by the oscillator 12. The mixer 3 generates a carrier signal which may have a frequency $f_o+f_1$ or $f_o-f_1$, and which is radiated by the antenna element 1. The mixer 3 is such that in this example the frequency $f_o+f_1$ is always provided, regardless of the actual value of frequency $f_o$. Mixers having this property are well known, and it is not necessary to provide a separate output filter tuned to the frequency $f_o+f_1$ in order to reject the other frequency of $f_o-f_1$. The phase-locked loop 13 is present to accurately control the phase of the signal which is radiated. The frequency $f_o$ is applied to the mixer 6 to regenerate the frequency $f_1$. This frequency is applied to the harmonic generator 7, which acts to introduce high harmonics of the frequency $f_1$. A particular harmonic $nf_1$ is selected by the bandpass filter 8 and applied to the phase comparator 9. The signal applied to terminal 10 also has frequency $nf_1$, but, in addition, has a predetermined reference phase. Thus the phase comparator 10 produces a control signal indicative of the phase difference between these two signals. This control signal adjusts the phase and frequency of the voltage controlled oscillator 12 to reduce this phase difference to zero.

Phase locking can occur at intervals of $2\pi$ radians of the frequency $nf_1$ which is passed by the bandpass filter 8, so that the corresponding phase of the signal radiated by the antenna element 1 may be any one of a series of values separated by phase intervals of $2\pi/n$ radians. To ensure that the correct phaselock is obtained, the output of the mixer 6 is also applied to a phase detector 14, for comparison with another reference signal $f_1$ applied at terminal 22. The resulting output signal is applied to a pulse generator 15. A signal representative of the required controllable phase value is applied via terminal 16, and if the signal provided by the phase detector 14 does not have the correct value, the pulse generator 15 generates a short control pulse which momentarily alters the frequency of oscillation of the oscillator 12. If this frequency shift gives a change of phase lying between $\pi$ and $3\pi$ during the period for which the pulse is applied, the phase-locked loop can re-lock giving a phase advance or delay of $2\pi/n$ radians as required. In this way the phase of the radiated signal can be stepped forwards or backwards by as many increments of $2\pi/n$ radians as are required by the application of as many pulses as are necessary.

Figure 2:
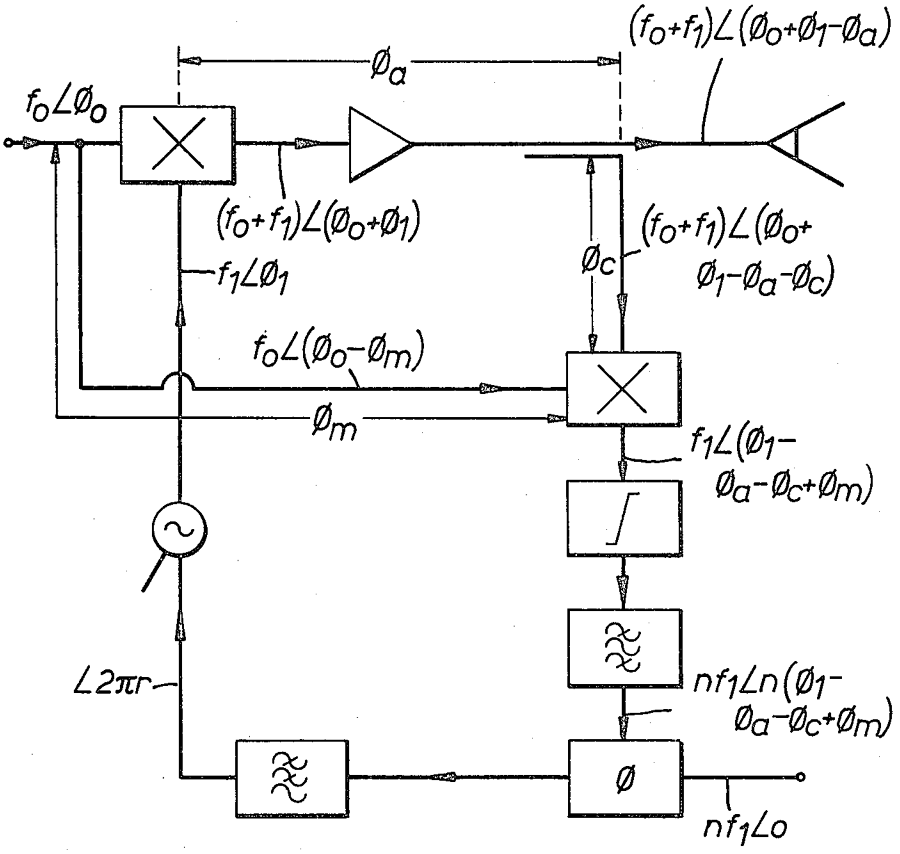
FIG. 2 illustrates the phase relations present in the antenna channel.

FIG. 2 shows in greater detail the phase and frequency relationships at various points in the antenna channel for the case in which the sum frequency signal $f_o+f_1$ is selected at mixer 3. At these points the frequency is given followed by the appropriate phase. In view of the foregoing description of FIG. 1, it is believed that FIG. 2 is largely self-explanatory. If the electrical length $\phi_m$ of the link between the mixers 3 and 4 carrying the signal of frequency $f_o$, is the same as that $\phi_c$ of the link between coupler 5 and mixer 6, then these phases $\phi_m$ and $\phi_c$ cancel and the phase of the loop signal at phase comparator 9 is $n(\phi_1-\phi_a)$. The action of the loop when locked is to make this angle equal to $2\pi r$. Consequently $$\phi_1-\phi_a=(2\pi r/n)$$

The phase of the signal at the antenna element 1 is $\phi_o+\phi_1-\phi_a$ or $\phi_o+(2\pi r/n)$, and can be set to values differing by increments of $(2\pi r/n)$ radians. Similar conditions are obtained if the difference frequency is selected at mixer 3, although this alternative is not specifically described.

As so far described the circuit operates satisfactorily provided that a signal of frequency $f_o$ is always present at input terminal 2, so that the phase-locked loop 13 is closed continuously. However in those cases in which microwave energy is radiated in the form of discrete pulses, phaselock will be lost during the quiescent intervals between pulses. Thus, the initial part of each pulse will be absorbed in attaining the correct phase, and to reduce this difficulty an additional link 20 (shown in broken line in FIG. 1) is provided. The link 20 includes a phase shift 21 which is nominally equal to the amplifier phase shift $\phi_a$ indicated on FIG. 2. This forms a secondary loop and enables correct phase to be retained so that the phase-locked loop is prepared for the next following pulse of energy. Provided that the signal from the amplifier 4 and coupler 5 is very much larger than that obtained via link 20, it will dominate and thus determine the actual phase of the oscillator 12 whilst the pulse is present.

A pulsed operation may be required in radar applications in which pulses of microwave energy are radiated, and echoes reflected from targets are received during the quiescent intervals between radar pulses. In general, an antenna arrangement will include a very large number of individual antenna channels. By adjusting the phase of a microwave signal radiated by each antenna element relative to that of adjacent elements the microwave energy can be arranged to constructively interfere in a predetermined direction of space. Thus a narrow beam of microwave power is transmitted in this direction.

Figure 3:
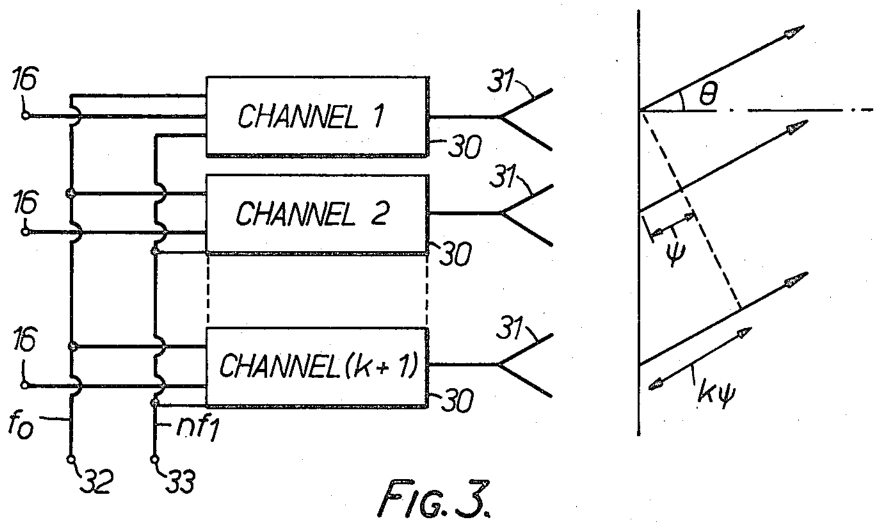
FIG. 3 shows an antenna arrangement in accordance with the present invention having a number of individual antenna channels.

FIG. 3 illustrates such an arrangement in which $(k+1)$ antenna channels 30 are provided, each having a separate antenna element 31. In practice, each antenna element 31 would typically be a microwave radiating horn. All channels are provided with the common frequency $f_o$ via terminal 32, and with the signal having a frequency $nf_1$, which carries the common reference phase. This latter signal is applied via terminal 33. Each channel 30 is provided with an individual control terminal 16 at which a control signal is applied indicative of the particular phase which that antenna channel is required to produce. With reference to FIG. 2, it will be seen that the phase of the signal applied to the antenna element is $\phi_o+\phi_1-\phi_a$. The phase $\phi_o$ is fixed and represents the phase of the signal of frequency $f_o$. Phase $\phi_1-\phi_a$ is set by the action of the phase-locked loop and the control pulses, and can be varied in multiples of the quantity $2\pi/n$. This is the variable part of the radiated signal phase. For a directional beam to be produced a progressive phase shift of $\psi$ must be introduced from channel 1 to channel $(k+1)$ where $\psi=\phi_1-\phi_a$. This means that channel $(k+1)$ must introduce a phase shift of $k\psi$ relative to channel 1. The microwave energy will then constructively interfere to produce a beam in the direction $\theta$ as indicated, where $\theta$ is the angle from the boresight of the antenna arrangement.

By altering the value of the common high frequency $f_o$, the carrier frequency of the radar can be readily altered giving what is sometimes termed frequency agility.

I claim:

1. An antenna arrangement having at least one antenna channel which comprises means for feeding a carrier signal via an amplifier to an antenna element, and a phase-locked loop which, in addition to said amplifier, includes: a controllable oscillator for generating an output signal having a predetermined intermediate frequency and a phase which is adjustable in dependence on a control signal; a mixer for mixing said output signal of said oscillator with a high frequency signal to form said carrier signal which is fed to said amplifier; a further mixer for mixing the output signal of said amplifier with said high frequency signal to reproduce said intermediate frequency; and phase comparison means for comparing the phase of the signal produced by said further mixer with a signal having a reference phase, with the result of said comparison being supplied to said oscillator as said control signal to control the phase of said intermediate frequency signal so that the phase of the carrier signal at the antenna bears a required relationship with said reference phase and is adjustable independently of variations in the frequency of said carrier signal.

2. An antenna arrangement as claimed in claim 1 further comprising means connected to the output of said further mixer for generating the $n^{th}$ harmonic of the signal produced by said further mixer; and wherein said phase comparison means compare the phase of said $n^{th}$ harmonic signal with said reference phase to generate the signal to control the phase of said oscillator.

3. An antenna arrangement as claimed in claim 1 and wherein a plurality of said antenna channels are provided, with the phase of the energy radiated by the different antenna elements being determined by the phase of the intermediate frequency signal generated within the phase-locked loop which forms part of its associated antenna channel.

4. An antenna arrangement as claimed in claim 3 wherein the phase of the intermediate frequency signal is different for each said antenna channel of a linear array of antenna elements.

5. An antenna arrangement as claimed in claim 4 wherein all of said antenna channels are supplied with a common high frequency signal so that each antenna radiates at the same carrier frequency.

6. An antenna arrangement as claimed in claim 5 wherein said common frequency signal is variable to produce a controllably alterable carrier frequency which is radiated by each antenna element.

7. An antenna arrangement as claimed in claim 6 wherein all of said channels are supplied with the same reference phase.

8. A radar incorporating an antenna arrangement as claimed in any of claims 3 to 7.

* * * * *